Feb. 15, 1966 C. H. DECHERT 3,234,894
FORAGE CROP PELLETER

Filed March 26, 1962 2 Sheets-Sheet 1

INVENTOR.
Charles H. Dechert
BY
Hovey, Schmidt, Johnson & Hovey.
ATTORNEYS.

Feb. 15, 1966   C. H. DECHERT   3,234,894
FORAGE CROP PELLETER
Filed March 26, 1962   2 Sheets-Sheet 2

INVENTOR.
Charles H. Dechert
BY
Hovey, Schmidt, Johnson & Hovey.
ATTORNEYS.

United States Patent Office 3,234,894
Patented Feb. 15, 1966

3,234,894
FORAGE CROP PELLETER
Charles H. Dechert, Paradise Valley Rte.,
Riverton, Wyo.
Filed Mar. 26, 1962, Ser. No. 182,393
9 Claims. (Cl. 107—14)

This invention relates to farm machinery, and more particularly, to a machine for pelleting a forage crop from the field in which the crop originated.

It is the primary object of the present invention to provide a machine for pelleting a forage crop from the field in which the crop originated, and wherein the machine severs the crop into a size suitable for subsequent passage into extrusion openings provided therefor so that the crop may be effectively pelleted from the machine without being mauled or damaged by the application of excessive pressures thereto.

A further object of the present invention is the provision of a machine of the aforesaid character wherein the severing of the crop takes place as a result of the pelleting action of the machine, whereby additional structure and power means for actuating the same are obviated, thus simplifying the over-all construction of the machine without impairing the pelleting capabilities thereof.

A still further object of the present invention is the provision of a machine of the aforesaid character which comprises a male roller die member having outwardly projecting plungers thereon, and a complemental, cylindrical female die member having tubular extrusion openings therein for receiving the plungers to force the crop into and through the openings, the latter being defined at the inlet ends by continuous, relatively narrow, thin marginal edges which are received within grooves surrounding the plungers, whereby portions of the crop bridging the grooves are severed by the edges to place the crop in condition for subsequent passage into the openings in response to the pelleting action of the plungers.

Yet another object of the present invention is the provision of male and female die members of the aforesaid character wherein the edges of the female die member "bottom out" within the grooves of the male die member so that the crop is severed, while at the same time the pressures created on the crop by the plungers are sealed or contained within the openings to thereby force the crop through the openings in a manner sufficient to pellet the crop.

Another object of the present invention is the provision of male and female die members of the character described wherein the grooves in the male die member are appreciably wider than the edges of the female die member so that the crop may not be trapped between the edges and the plungers to thereby prevent the build-up of excessive pressures which might damage the crop as the same is being pelleted.

Still another object of the present invention is the provision of male and female die members which may be operably interconnected in a manner such that rotation of one of the members is sufficient to rotate the other member, while at the same time the counter forces on the members created as a result of the pelleting action, are effectively absorbed without causing structural damage to the members themselves.

Other objects of the present invention will become apparent as the following specification progresses, reference being had to the accompanying drawings, wherein.

The present invention comprises a pelleting machine which includes a roller male die member having a number of circumferentially spaced, radially extending plungers on the outer surface thereof, and a cylindrical, rotatable female die member having a number of tubular, radially disposed extrusion openings therein which receive a crop and the plungers as the latter force the crop through the extrusion openings. Means is provided for rotating one of the members and, since the plungers are received within the openings, the other member is also rotated in response to the rotation of said one member. Means is also provided for adjustably interconnecting the die members so that the amount by which the plungers enter the extrusion openings may be varied, depending upon the crop to be pelleted and the desired characteristics of the crop to be pelleted.

A first and preferred embodiment of the present invention, is constructed with the male die member disposed within and eccentrically to the female die member. The product to be pelleted is then forced radially outwardly with respect to the axis of rotation of the female die member.

Figures 1, 2:
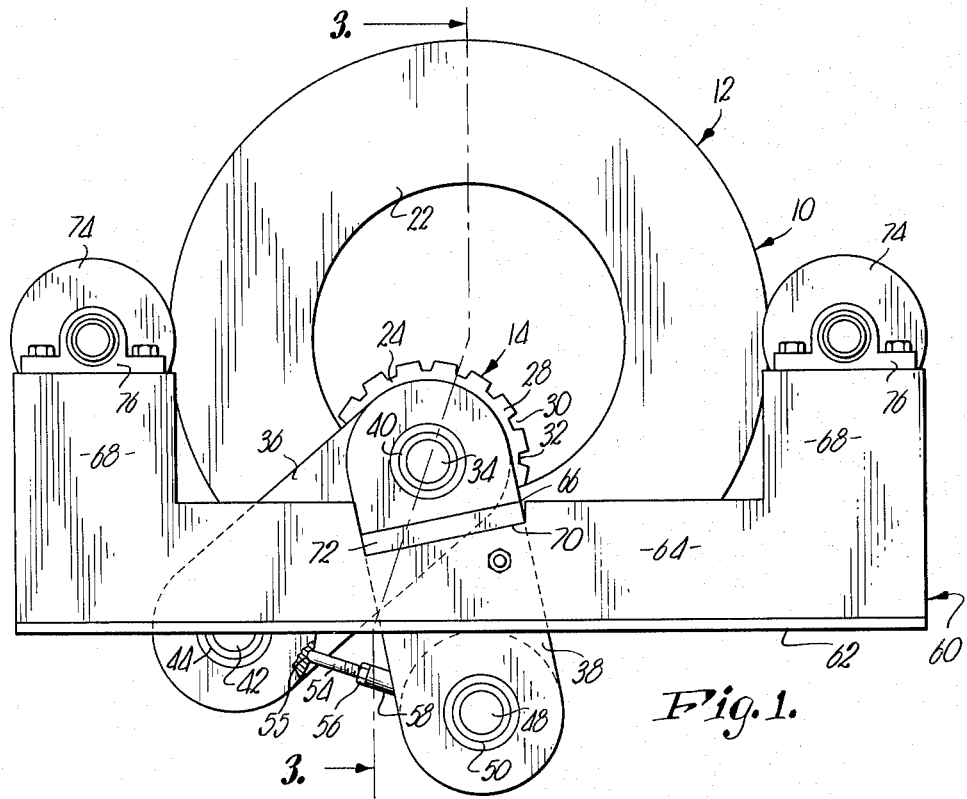
FIGURE 1 is an elevational view of a preferred embodiment of the pelleting machine which forms the subject of the present invention and illustrating a cylindrical female die member and a roller male die member within the female die member.
FIG. 2 is a fragmentary view of the male and female die members and adjustable structure for interconnecting the members, parts being in section to illustrate details of construction.
Figure 3:
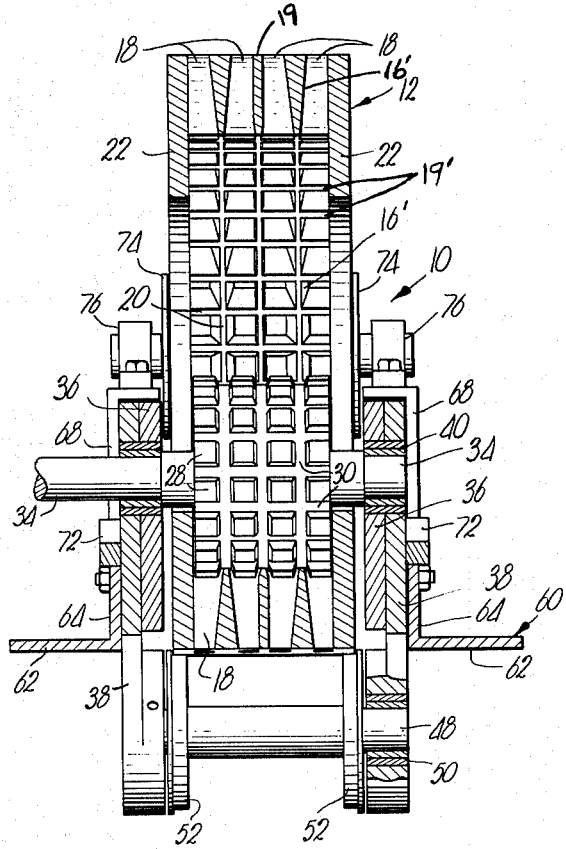
FIG. 3 is a cross-sectional view taken along line 3—3 of FIG. 1.

In FIGS. 1, 2 and 3 a preferred embodiment of the pelleting machine which forms the subject of the present invention is illustrated, which machine is broadly denoted by the numeral 10. Machine 10 includes a rotatable, cylindrical female die member 12 and a male roller die member 14 operably coupled with female die member 12.

Female die member 12 is formed from a generally annular body 16 having a plurality of circumferentially spaced, radially disposed, tubular extrusion openings 18 therein which are of such a dimension to define a number of continuous edges 20 on the normally innermost surface of body 16. Edges 20, as illustrated in FIG. 3, present a grid, the thickness of each of the edges 20 being relatively thin to provide a minimum obstruction to the passage of a crop into openings 18. Openings 18 are substantially square at the inlet ends thereof and one of the inner surfaces of each of the openings 20 tapers toward the opposed surface in the manner illustrated in FIG. 3. As shown in FIG. 3 each row of openings includes four openings 18. Each of the two outer openings are constituted by three parallel side walls and one tapered wall 16'. The three parallel walls include one of the outer ring elements 22 and two of a series of walls 19' which separate the openings circumferentially around the body 16. Spacer element 19 serves as one of the parallel walls for each of the two inner openings of each row. Thus, the openings at the outlet ends thereof are rectangular, it being clear in FIG. 3 that there are a number of openings aligned transversely with respect to the circumference of body 16. Thus, crop being forced through openings 20 is substantially compressed as the outlet ends of openings 18 are approached. A pair of spaced, ring-like elements 22 is secured to body 16 at opposed sides of the latter, the inner diameter of each element 22 being substantially less than the diameter of the inner surface of body 16, as is shown in FIG. 2. Elements 22 are substantially concentric with body 16 with the outer peripheral edges of elements 22 being substantially of the same diameter as the outer surface of body 16.

Male die member 14 includes a generally solid, cylindrical structure 24 having a central opening 26 therethrough. Structure 24 has a number of projections on the outer surface thereof providing a plurality of circumferentially spaced, radially disposed plungers 28 adapted for insertion within the inlet ends of corresponding extrusion openings 18. It is to be noted that plungers 28 extend in aligned rows transversely of the circumference of structure 24 as is clear in FIG. 3, there being the same number of transversely aligned plungers 28 as the number of transversely aligned extrusion openings 18.

The spaces or grooves 30 surrounding each plunger 28 present anvil surfaces 32 radially inwardly of the outermost, generally flat surfaces of plungers 28.

Male die member 14 is disposed in an operating position between elements 22 and in juxtaposition with female die member 12 adjacent the normally lowermost portion of the latter, as is clear in FIG. 2. In this position, the axis of revolution of structure 24 is spaced below and slightly to the side of the axis of revolution of body 16. A shaft 34 extends through opening 26 in structure 24 and projects outwardly from the latter in opposed directions. A pair of elongated plates 36 and 38 are secured at corresponding ends thereof to each end of shaft 34 and depend therefrom in the manner illustrated in FIG. 1. A roller type bearing 40 is disposed between shaft 34 and each pair of plates 36 and 38 to permit shaft 34 to be rotated with respect to plates 36 and 38.

A shaft 42 spans the distance between each pair of plates 36 and is journalled in bearings 44 at the lowermost ends of plates 36 for rotation relative thereto. A pair of spaced supports in the nature of rollers 46 are secured to shaft 42 for rotation therewith. Similarly, a shaft 48 spans the distance between the lowermost ends of plates 38 and is journalled in bearings 50 carried by plates 38. A pair of spaced supports in the nature of rollers 52 is carried by shaft 48 for rotation therewith.

Shafts 42 and 48 are disposed exteriorly of body 16 in the manner shown in FIG. 2 so that body 16 is supported by rollers 46 and 52 at the junctions between body 16 and elements 22. It is to be noted that plates 36 and 38 may be independently rotated about shaft 34 and to this end, adjustment means in the nature of a screw 54 is carried by each plate 36 in a hole 55 in plate 36 and is threadably received within a nut 56 carried by a tubular extension 58 having one end thereof received in a hole 59 in the corresponding plate 38. Thus, the plates 36 and 38 and respective holes 55 and 59 serve to secure screw 54 and extension 58 to the corresponding plates for maintaining a predetermined spacing between the plates. The position of male die member 14 with respect to female die member 12 may thus be varied by varying the position of screw 54 within nut 56. For instance, if it is desired to move structure 24 so that plungers 28 are disposed at a greater depth within extrusion openings 18, nut 56 is manipulated to shift shafts 42 and 48 away from each other. Conversely, if it is desired to decrease the depth at which plungers 28 enter extrusion openings 18, nut 56 is manipulated to permit shafts 42 and 48 to move toward one another.

Edges 20 and grooves 30 cooperate in a manner to sever portions of a crop bridging grooves 30 in response to the pressure applied to the crop by plungers 28 when the crop is forced into the inlet ends of extrusion openings 18.

A support 60 includes a pair of spaced channel members 62, each having a generally U-shaped, vertical portion 64 provided with a notch 66 therein intermediate the opposed sides 68. Notch 66 has an inclined surface 70 and is of a width for receiving an elongated web 72 integral with the normally outermost surface of the corresponding plate 38.

A pair of rollers 74 are mounted on the upper surface of each of the sides 68 by bearing means 76 in the manner shown in FIGS. 1 and 3. Rollers 74 are spaced-apart a distance substantially equal to the distance between the outer surfaces of elements 22 so that the rollers 74 engage the outer surfaces of corresponding elements 22 to stabilize female die member 12 as male die member 14 is supported within notch 66.

As shown in FIG. 3, shaft 34 projects outwardly from the corresponding plate 38 and beyond support 60. The outermost end of shaft 34 is operably coupled to power means such as the power take-off connection of a conventional tractor.

In operation, support 60 is operably coupled with a towing vehicle, such as a tractor or the like, for moving machine 10 in a predetermined direction over the ground. The crop to be pelleted is placed within female die member 12 through the opening in one of the elements 22. Shaft 34 is rotated in a clockwise sense when viewing FIG. 2 and, since plungers 28 are disposed in adjacent extrusion openings 18, female die member 12 rotates also in the same direction. The crop gravitates to the bottom of body 16 between elements 22 and is forced into the inlet ends of adjacent openings 18 by plungers 28. The crop substantially bridges grooves 30 so that edges 20 moving into grooves 30, sever the crop in response to the pressure applied to the crop already in the corresponding opening by the corresponding plunger 28. Edges 20 essentially "bottom out" within grooves 30 so that the crop is severed into stampings substantially the size of the inlet of each of the openings 18. The widths of grooves 30 are appreciably greater than the thicknesses of edges 20 so that none of the crop will be trapped between the side faces of plungers 28 and edges 20. Such construction also prevents the build-up of excessive pressure which might damage the crop as the same is being pelleted.

Plungers 28, therefore, apply pressures sufficient to pellet the crop and the crop is inserted within extrusion openings 18 in layers. The crop issuing from openings 18 passes between each pair of rollers 46 and 52 and either falls to the ground or is collected by suitable structure beneath support 60.

Plates 36 and 38 are preferably of a size, weight and construction to absorb the counter forces which are created as a result of the bottoming, severing and pelleting actions of female and male die members 12 and 14. Manifestly, members 12 and 14 are of rugged construction to withstand the relatively high pressures which are inherent in a machine of this nature. By rotating female die member 12 in response to the rotation of male die member 14, additional structure and power means therefor required to rotate member 12, is obviated to thus simplify the over-all construction of machine 10.

As edges 20 engage the anvil surfaces 32 formed by grooves 30, the pressure on the crop within the openings 18 created by plungers 18, is sealed or contained within the openings to thereby force the crop through the openings 18 with sufficient pressure to pellet the same and thus avoid passing the crop through the openings 18 without pelleting the same.

Although plungers 28 have been shown with flat outer faces, such faces may be concave if desired, so that plungers 28 exert pressure throughout the full cross-sectional areas of the openings 18 and directly thereinto.

Machine 10 may be utilized for crops having differing characteristics by adjusting male die member 14 with respect to female die member 12. This is accomplished by manipulating nut 56 on screw 54 to thereby vary the spacing between the axes of rotation of female and male die members 12 and 14.

The crop between edges 20 and surfaces 32 is substantially gripped just prior to the severing process, and the crop is sheared by the action of the plungers 28 forcing the crop into the corresponding opening 18.

Thus, openings 18 provide compression chambers which compress the crop into a form binding one layer of the crop with an adjacent layer.

An important result from use of the invention as above described is the nature of the pellet itself. As the crop is forced through the extrusion openings the ends of the stems and other fibrous parts tend to fold back and close all four sides of the pellet. Such folded ends glaze because of high pressure and as the same slide along walls that form the extrusion openings. As a consequence, the pellet is sealed on all surfaces, reducing the amount of air flow therethrough, thereby reducing the rate of drying and loss of carotene and vitamin A. When it is considered that pelleting can be accomplished with the instant invention while the crop still has a relatively high percentage of water content, the over-all benefits derived from food value savings adds materially to the advantages derived from the invention.

Having thus described the invention, what is claimed as new and desired to be secured by Letters Patent is:

1. In a pelleting machine:
   (a) a cylindrical female die member having a circumferential surface and a plurality of elongated, tubular extrusion openings extending through said member, the longitudinal axis of each opening extending radially of the member, each opening being defined by a pair of opposed sides lying in planes extending parallel with said longitudinal axis, a third side lying in a plane extending in generally perpendicular relationship to the planes of said pair of sides, and a fourth side lying in a plane disposed at an angle with respect to said longitudinal axis so as to taper towards the inside of the opening to restrict the same, the taper of said fourth side extending continuously from the inlet end of said opening to the outlet end thereof, said fourth side being an integral one piece construction, each opening being defined at its inlet end by a continuous edge, presenting a grid defining said circumferential surface of the female die member;
   (b) a complemental male, roller die member provided with grooves for receiving said edges, setting off a number of plungers adapted to enter the openings; and
   (c) means for rotating the members in unison to continuously insert consecutive plungers into successive openings, said edges facing the bottoms of the grooves when the plungers enter the openings whereby material introduced between the members bridges across said edges in the bottoms of the grooves and is severed by the force of the plungers extruding the material through the openings.

2. A pelleting machine as set forth in claim 1 wherein the plane of said third side is parallel with the longitudinal axis of said opening.

3. A pelleting machine as set forth in claim 2 wherein said openings in the female die member are positioned so as to provide a row of extrusion openings extending parallel with the longitudinal axis of said female member, the row of openings including a pair of adjacent openings disposed with the said third sides thereof in juxtaposed relationship.

4. A pelleting machine as set forth in claim 2 wherein said openings in the female die member are positioned so as to provide four circumferentially extending series of extrusion openings, the openings of each series being arranged in side-by-side relationship with the corresponding openings of an adjacent series to present a plurality or rows of openings with four openings in each row, said rows extending parallel with the longitudinal axis of the female die member, the said third sides of the innermost pair of openings of each row being disposed in juxtaposed relationship and the said fourth sides of each outermost opening of said row thereof being disposed in juxtaposed relationship with the said fourth side of the adjacent opening of said innermost pair thereof.

5. In a material pelleting machine,
   (a) a cylindrical, rotatable, female die member having an inner annular face concentric to its axis of rotation and provided with a plurality of tubular, radially disposed extrusion openings, each defined at its inlet end by a continuous edge, presenting a grid defining said annular face;
   (b) a complemental, rotatable, male, roller die member disposed within and in juxtaposition to said face of the female die member for rotation about an axis eccentric to and parallel with said axis of rotation of the female die member, said male die member having a surface surrounding its axis of rotation and provided with a number of plungers throughout said surface adapted to enter the openings at said inlet ends of the latter, each plunger being surrounded by a groove in said surface;
   (c) means for rotating the members in unison to draw the material therebetween in bridging relationship to the grooves and to the inlet ends of the openings, the plungers being disposed to enter successive openings and the edges being disposed to enter corresponding grooves during rotation of the members, whereby the edges force the material in one direction into the grooves and the plungers force the material in the opposite direction into the openings;
   (d) a rotatable support for the female die member disposed exteriorly of the latter, said support including roller means below the female die member in supporting relationship thereto;
   (e) a shaft on said axis of rotation of the male die member journalling the latter; and
   (f) means coupling the shaft and the support including plate structure interconnecting said roller means and said shaft for maintaining a predetermined spacing between said axes of rotation as the material is forced into said openings.

6. In a material pelleting machine as set forth in claim 5, wherein said plate structure includes a pair of relatively shiftable plates adjacent each end of the shaft respectively, each pair of said plates being rotatably mounted on the shaft and being provided with means adjacent their lower extremities for maintaining a predetermined spacing between said lower extremities, there being a plate adjacent one end of the shaft aligned with a corresponding plate adjacent the opposite end of the shaft, said roller means including a pair of rollers for each pair of aligned plates respectively.

7. In a pelleting machine as set forth in claim 6, wherein is provided a second support on each of the opposed sides of said female die member, each second support having an upper extremity provided with a notch therein, one of the plates adjacent each end of said shaft having a laterally projecting web thereon, said webs being disposed within corresponding notches whereby the shaft and thereby said die members are supported by said second support.

8. In a material pelleting machine as set forth in claim 6, wherein said maintaining means includes adjustable structure for each pair of plates respectively adjacent one end of the shaft, said adjustable structure being movable into any one of a number of fixed locations to permit changes in the distance between the lower extremities of said plates.

9. In a pelleting machine as set forth in claim 8, wherein said adjustable structure includes a screw secured to and projecting outwardly from one plate toward the adjacent plate, an extension secured to the other plate and projecting toward said one plate, and a nut carried by said extension and threadably receiving said screw.

(References on following page)

References Cited by the Examiner

UNITED STATES PATENTS

| | | | |
|---|---|---|---|
| 1,238,981 | 9/1917 | Barton. | |
| 1,803,344 | 5/1931 | Noxon | 107—8.35 |
| 1,804,283 | 5/1931 | Sizer | 107—8.35 |
| 1,869,492 | 8/1932 | O'Halloran | 107—8.35 |
| 1,931,759 | 10/1933 | Hasing. | |
| 1,960,548 | 5/1934 | Pfeiffer | 107—54 |
| 2,052,449 | 8/1936 | Connell | 107—8.35 |
| 2,065,141 | 12/1936 | Meakin | 107—54 |
| 2,174,141 | 9/1939 | Sizer | 107—8.35 |
| 2,336,114 | 12/1943 | Meakin | 107—8.35 |
| 2,995,096 | 8/1961 | Roskamp | 107—14 |
| 3,052,192 | 9/1962 | Forth et al. | 107—14 |
| 3,063,361 | 11/1962 | Gehrke | 100—98 |
| 3,177,821 | 4/1965 | Harrington | 107—14 |

FOREIGN PATENTS

| | | |
|---|---|---|
| 20,970/29 | 7/1930 | Australia. |
| 379,390 | 8/1923 | Germany. |
| 636,574 | 10/1936 | Germany. |

WALTER A. SCHEEL, *Primary Examiner.*

CHARLES A. WILLMUTH, *Examiner.*